(12) United States Patent
Nie et al.

(10) Patent No.: US 8,156,420 B2
(45) Date of Patent: Apr. 10, 2012

(54) FORM VALIDATION WITH TABLE DRIVEN ERROR HANDLING

(75) Inventors: Qingyang Nie, Shanghai (CN); Zhiqing Hong, Shanghai (CN); Yimin Zhang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/271,717

(22) Filed: Nov. 14, 2008

(65) Prior Publication Data

US 2010/0125762 A1    May 20, 2010

(51) Int. Cl.
*G06F 3/00* (2006.01)
(52) U.S. Cl. .................... 715/221; 715/222; 715/224
(58) Field of Classification Search .......... 715/221, 715/222, 224, 505, 506, 507
See application file for complete search history.

(56) References Cited

U.S. PATENT DOCUMENTS

| | | | |
|---|---|---|---|
| 6,167,523 A | 12/2000 | Strong | |
| 6,915,454 B1 | 7/2005 | Moore et al. | |
| 7,099,918 B2 | 8/2006 | Matti | |
| 7,366,977 B2 | 4/2008 | Chokshi | |
| 7,461,382 B2 * | 12/2008 | Hammerich et al. | 719/318 |
| 2004/0024842 A1 | 2/2004 | Witt | |
| 2004/0216134 A1 * | 10/2004 | Hammerich et al. | 719/318 |
| 2005/0028084 A1 | 2/2005 | Dziejma | |
| 2005/0108625 A1 * | 5/2005 | Bhogal et al. | 715/505 |
| 2009/0187879 A1 * | 7/2009 | Ao et al. | 717/101 |

OTHER PUBLICATIONS

Ted N. Husted, et al., "Struts in Action," Chapter 12—Validating User Input (Manning Publications Co., Dec. 2002).*
Microsoft Press, "Microsoft Computer Dictionary, Fifth Edition" (Microsoft Press, May 2002).*
Andrew Turner, Linux Journal, "Geolocation by IP Address," 10 pages (Oct. 2004), available at http://www.linuxjournal.com/article/7856.*
"Easy Client-Side and Server-Side Form Validation", Retrieved from <http://webrehash.com/2008/02/10/easy-client-side-and-server-side-form-validation/> on Sep. 2, 2008, (Feb. 10, 2008),4 pages.
"Validation", Retrieved from <http://msdn.microsoft.com/en-us/asp.net/aa336647.aspx> on Sep. 2, 2008, (Jan. 2004),6 pages.
Nelson, Joe "Client-Side Form Validation Using JavaScript", *The EDG Developer Advisory*, Available at <http://edg.utah.gov/developer_advisory/form_validation/validation.pdf>,(Sep. 21, 2001),pp. 1-9.

* cited by examiner

*Primary Examiner* — Doug Hutton, Jr.
*Assistant Examiner* — Scott M Kelly (57) ABSTRACT

Various embodiments provide a validation framework to validate whether data entered in a web application is valid. The framework includes a validation resource that contains a validation rule for the web application. The framework also includes a validation group web control that can generate client validation script that is useable by a client to validate whether the entered data is valid. In at least some embodiments, an event table that specifies the validation rules is used to present an error message when the entered data is not valid.

19 Claims, 7 Drawing Sheets

FORM VALIDATION WITH TABLE DRIVEN ERROR HANDLING

BACKGROUND

Form validation is used to check whether data entered via a web application is valid. When the entered data is not valid, error handling is used to alert a user to the error.

Today, client side validation is used to validate entered data and can be complex as numerous validation rules can be applied to the entered data. Typically, validation code is written for a particular situation and is not reusable across clients or servers. Thus, code written to validate data entered in one situation may be unusable in other situations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a validation framework to validate whether data entered in a web application is valid. The framework includes a validation resource that contains a validation rule for the web application. The framework also includes a validation group web control that can generate client validation script that is useable by a client to validate whether the entered data is valid. In at least some embodiments, an event table that specifies the validation rules is used to present an error message when the entered data is not valid.

BRIEF DESCRIPTION OF THE DRAWINGS

The same numbers are used throughout the drawings to reference like features.

DETAILED DESCRIPTION

Overview

Various embodiments provide a validation framework to validate whether data entered in a web application is valid. The framework includes a validation resource that contains a validation rule for the web application. The framework also includes a validation group web control that can generate client validation script that is useable by a client to validate whether the entered data is valid. In at least some embodiments, an event table that specifies the validation rules is used to present an error message when the entered data is not valid.

In the discussion that follows, a section entitled "Operating Environment" describes but one environment in which the various embodiments can be employed. Following this, a section entitled "Example Validation/Error Handling Development" describes a framework for validation and/or error handling in accordance with one or more embodiments. Next, a section entitled "Form Validation and Error Handling—Implementation Example" describes an example validation and/or error handling system in accordance with one or more embodiments. Following this, a section entitled "Example System" describes an example computing system that can be used in conjunction with the described embodiments.

Operating Environment

Figure 1:
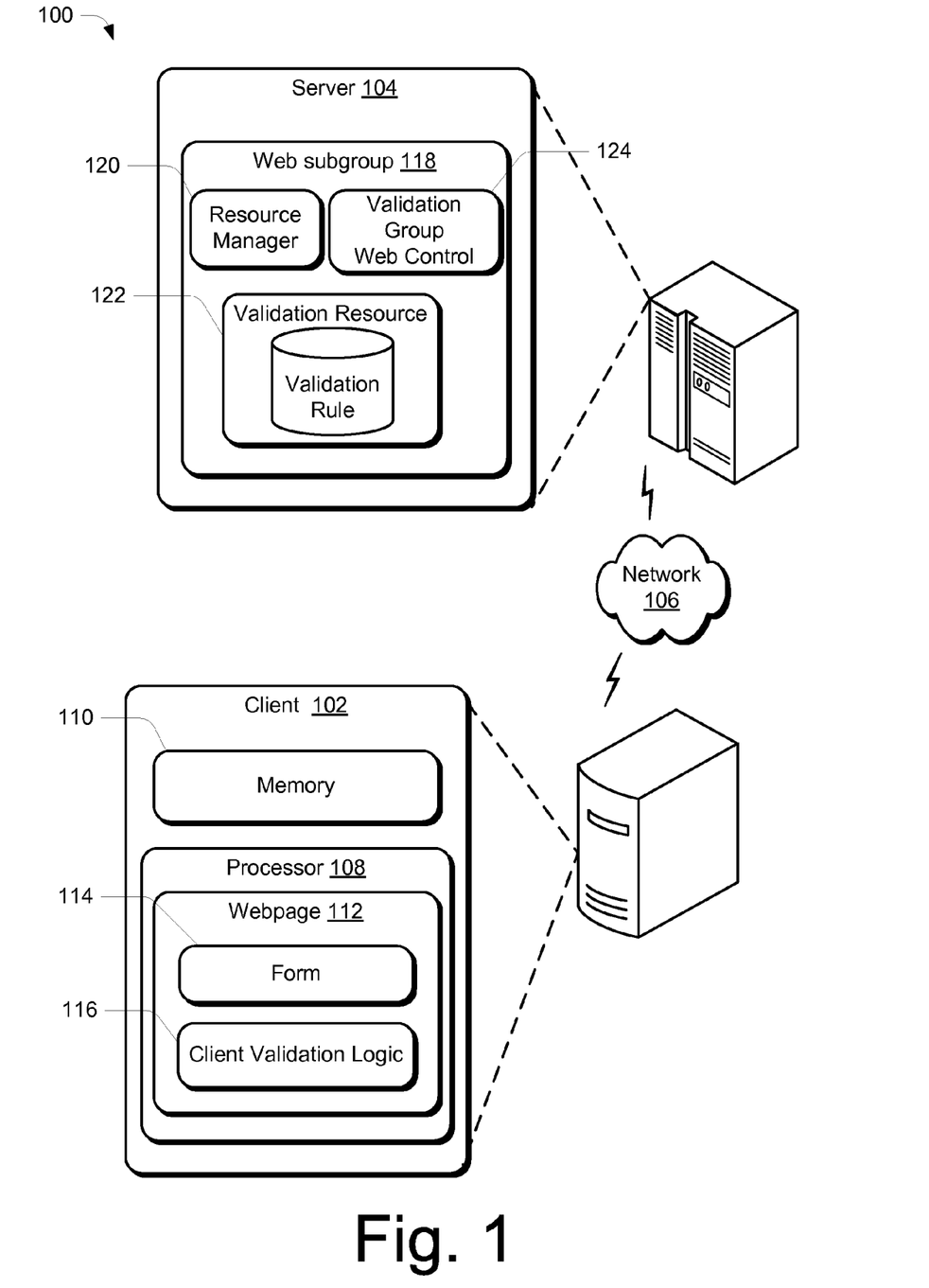
FIG. 1 illustrates an operating environment in which the inventive principles can be employed in accordance with one or more embodiments.

FIG. 1 illustrates an operating environment in accordance with one or more embodiments, generally at 100. Environment 100 includes a client 102, a server 104 and a network 106. The client 102 and server 104 can take any suitable form, examples of which are laptops computers, desktop computers, web servers, enterprise servers, and the like.

Although a single server and a single client are illustrated, multiple devices may be included in the environment. For example, multiple servers can be used to provide webpages to various clients.

Network 106 can comprise any suitable type of network such as the Internet or a wide variety of other types of networks. For example, the network 106 may include a wide area network (WAN), a local area network (LAN), a wireless network, an intranet, and so on. Further, although a single network is shown, the network 106 may be configured to include multiple networks.

The client 102 is illustrated as including a processor 108 and memory 110. Although a single processor is illustrated, multiple processors may be included in the client 102. Additionally, although a single memory is shown, a wide variety of types and combinations of memory may be employed, such as random access memory (RAM), hard disk memory, removable medium memory, and other types of computer-readable media. One specific example of a computing device that can be used to implement client 102 is shown and described below in FIG. 7.

The client 102 includes a webpage 112 that is presented under the influence of the processor 108 on a display (not shown). For example, the webpage 112 may be presented using a web browser that runs under the influence of the processor 108. The webpage 112 may include a form 114 and associated client validation logic 116 that are downloaded from the server 104. The client validation logic 116 may take the form of client validation script that executes to perform validation logic described in more detail below.

The form 114 can be used present visual objects, such as images, text, user input structures, and the like, for the webpage 112. For example, the form 114 may present a text box that is configured to accept text from a user. Webpage 112 can be implemented using hypertext markup language (HTML) or other markup languages. For example, extensible hypertext markup language (XHTML) can be used to present the webpage 112.

The client validation logic 116 is configured to validate and/or log errors associated with a user's interaction with the webpage 112 and, more specifically, the form 114. For example, when a text box is presented to a user and the user types a number in the text box, the client validation logic 116 can check whether the number is valid for the text box based on one or more validation rules for the text box. The client validation logic 116 may generate a record of an event that triggered the validation in accordance with one or more embodiments.

Although the form 114 and client validation logic 116 can be provided by a single server, each may be obtained from multiple sources In one or more embodiments, the server 104 can include a web subgroup 118 that includes components to provide various functionality to client 102. In an embodiment, the web subgroup 118 can include a resource manager 120, a validation resource 122, and a validation group web control 124. As mentioned previously, the resource manager 120, validation resource 122, and/or the validation group web control 124 may be included on different servers that act in concert with each other.

The validation resource 122 is configured to store validation rules associated with different forms. The validation resource 122 may store validation rules for multiple localities. The validation resource 122 can store validation rules for specific languages, countries, regions, and the like. For example, the validation resource 122 may include credit card validation rules for use with forms that include text boxes for entry of credit card information for different countries, e.g., U.S., Europe, Japan, and the like. In this manner, the validation rules can be "globalized" to permit reuse and can apply standardized rules. For example, validation rules for credit cards in the United States as well as other countries may include common validation rules. Examples of common validation rules include but are not limited to, a specified number of digits allowed to be entered, a number pattern, and the like. In other instances, the validation rules may be "customized" for the webpage 112.

The resource manager 120 is operable to manage the server side aspects of the webpage 112. The resource manager 120 can manage the validation resource 122 and the validation group web control 124. The resource manager 120 may perform additional functions, such as generating error handling script to perform error handling logic on the client 102.

The validation group web control 124 is configured to generate script based on the validation rules read from the validation resource 122. The validation group web control 124 can take one or more validation rules associated with the webpage 112 and generate client validation script to be embedded in the form 114 or otherwise provided to the client 102. Thus, the validation group web control 124 can generate client validation script, e.g., data validation script, when a HTML text box is included in the particular webpage. This can permit direct usage of the validation rules by the server.

In one or more embodiments, the validation group web control 124 is operable to obtain a locale associated with the client 102. In a specific example, the validation group web control 124 can determine the client's locale from the IP address for the client 102. The locale can be used to indicate which validation rules are to be used as the basis for the client validation script.

Having considered an example operating environment, consider now a discussion of an example system that provides a framework in accordance with one or more embodiments. The example system may be used in conjunction with the environment described above. Like numerals in the discussion below are utilized to depict like components described above.

Example Validation/Error Handling Development

Figure 2:
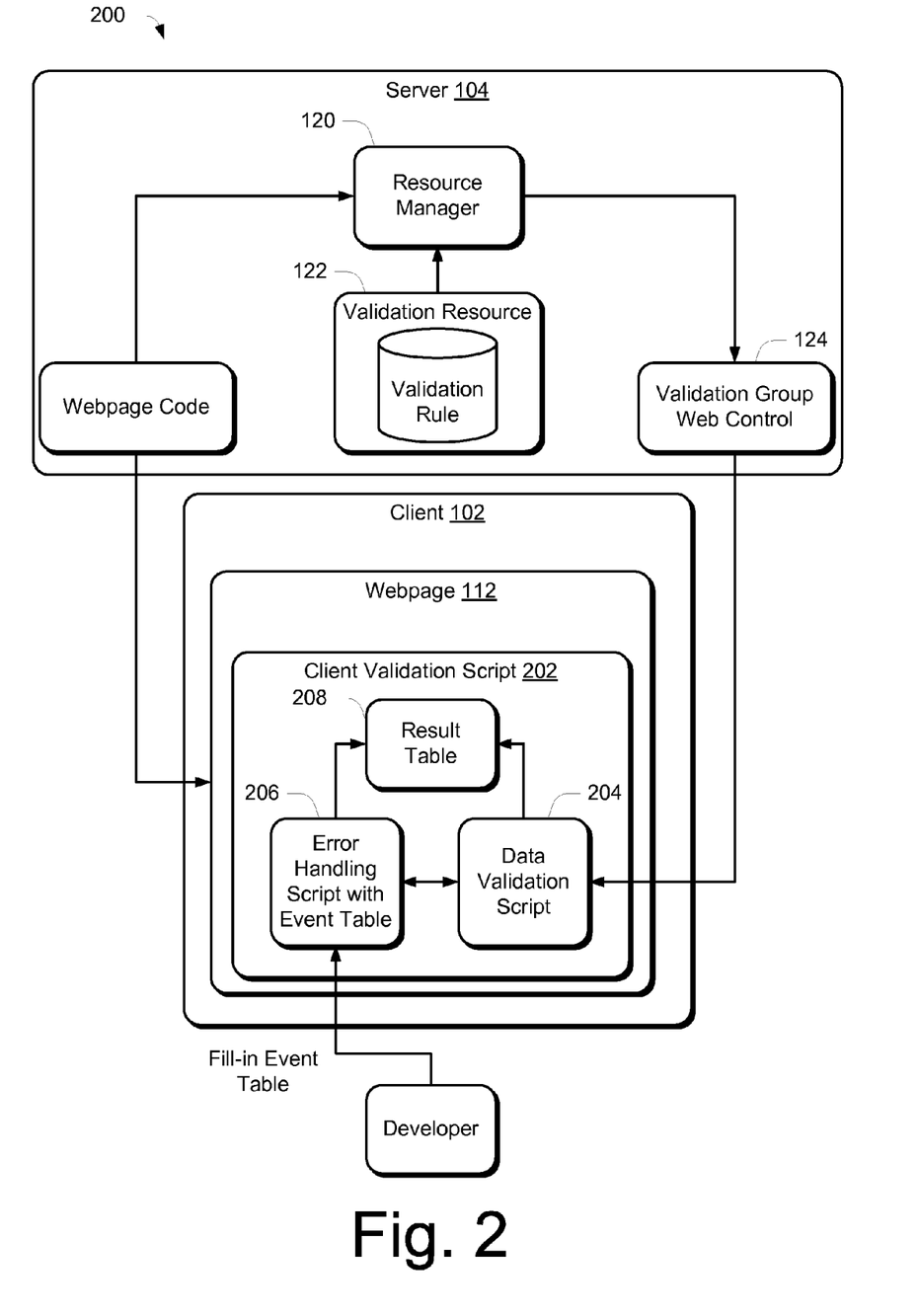
FIG. 2 illustrates a system in accordance with one or more embodiments.

FIG. 2 illustrates a system generally at 200 showing sample data flows and describing development of the webpage 112 in accordance with one or more embodiments. In this example, the client 102 includes a client validation script 202 having a data validation script 204, an error handling script 206 with an event table, and a result table 208 for the webpage 112. Although error handling script 206 and data validation script 204 are discussed together, it is to be appreciated that event table data validation and error handling can be used separately.

In the illustrated and described embodiment, a developer can use the form 114 (FIG. 1) and client validation script 202 used to perform the client validation logic to develop the webpage 112. The client validation script 202 may include an event table that may be filled-in by a developer. The event table can contain developer specifications of one or more validation rules that are to be associated with the webpage 112. For example, the validation rules may serve as a basis for validating text entered into a text box on the webpage 112. The event table can contain a specification of validation rules that can include a validation rule itself and/or an indicator that designates the validation rule. For example, a developer may write the event table and/or the validation rules directly in the webpage 112. In this context, the event table may be "plugged-in" to the framework to reduce webpage development time in comparison to traditional validation development approaches.

The specified validation rules may correspond to validation rules in the validation resource 122. In some instances, the validation rules themselves are written in the event table. Thus, a text box for a credit card number can have corresponding validation rules including maximum length, minimum length, a pattern, and so forth.

The validation group web control 124 can use the validation rules to generate the client validation script 202 when the webpage 112 is accessed by the client 102. The specified validation rules may be "globalized" so that when the webpage 112 is presented to clients located in various locales, the validation rules correspond to the locale of the client 102. In this way, a particular validation rule implemented for the webpage 112 can correspond to the locale of the client 102. For example, an English validation rule can be used for a U.S. client, while a French validation rule can be used for a French client. This also can permit reuse of the validation rules among multiple webpages and decouple visual and business logic aspects of the webpage 112.

In some embodiments, the event table can accept "customized" validation rules. "Customized" validation rules can be written to the event table for a particular webpage or group of webpages. In this context, the "customized" validation rule is filled into the event table. Thus, a text box may be validated based on a "customized" validation rule in the event table that is filled-in by a developer. In some embodiments, the customized validation rule may be stored in the validation resource 122 and/or in the event table for the webpage 112. "Customized" validation rules can be used as a basis for generating client validation script 202 as described above and below.

In one or more embodiments, the event table can permit developers to create the webpage 112 in a globalized manner. The event table may be supported both on the server and client. By configuring the server 104 and client 102 in this manner, a single copy of the validation resource 122 can be included on the server 104 thereby reducing inconsistency issues in comparison to traditional techniques.

In this particular example, the result table 208 is included in the client validation script 202. The result table 208 stores records of validation events. Event records may include data associated validation errors, successes, and the like for an event that triggers validation. Thus, as text is entered in the text box, the data validation logic performed by the data validation script can validate each entered character for an event, e.g., a key press.

In the illustrated and described embodiment, error handling script 206 is downloaded from the server 104 to perform error handling logic. The error handling logic functions to present an error message when an error has occurred.

The error handling script 206 can read the event table that describes the error handling logic and drive the error handling behavior with coordination of both the event table and the running result (result table 208) of client validation script. The error handling logic may check the result table 208 for an error record that corresponds to an error for which an error message exists in the event table. In additional embodiments, the event table may be included in a separate file that is included with the webpage 112. When an error message corresponding to the error record exists in the event table, the error handling logic can present the error message to a user.

Having discussed webpage development using an event table, consider now a discussion of how the system can be used. Like numerals in the discussion below are utilized to depict like components described above.

Form Validation and Error Handling—Implementation Example

Figure 3:
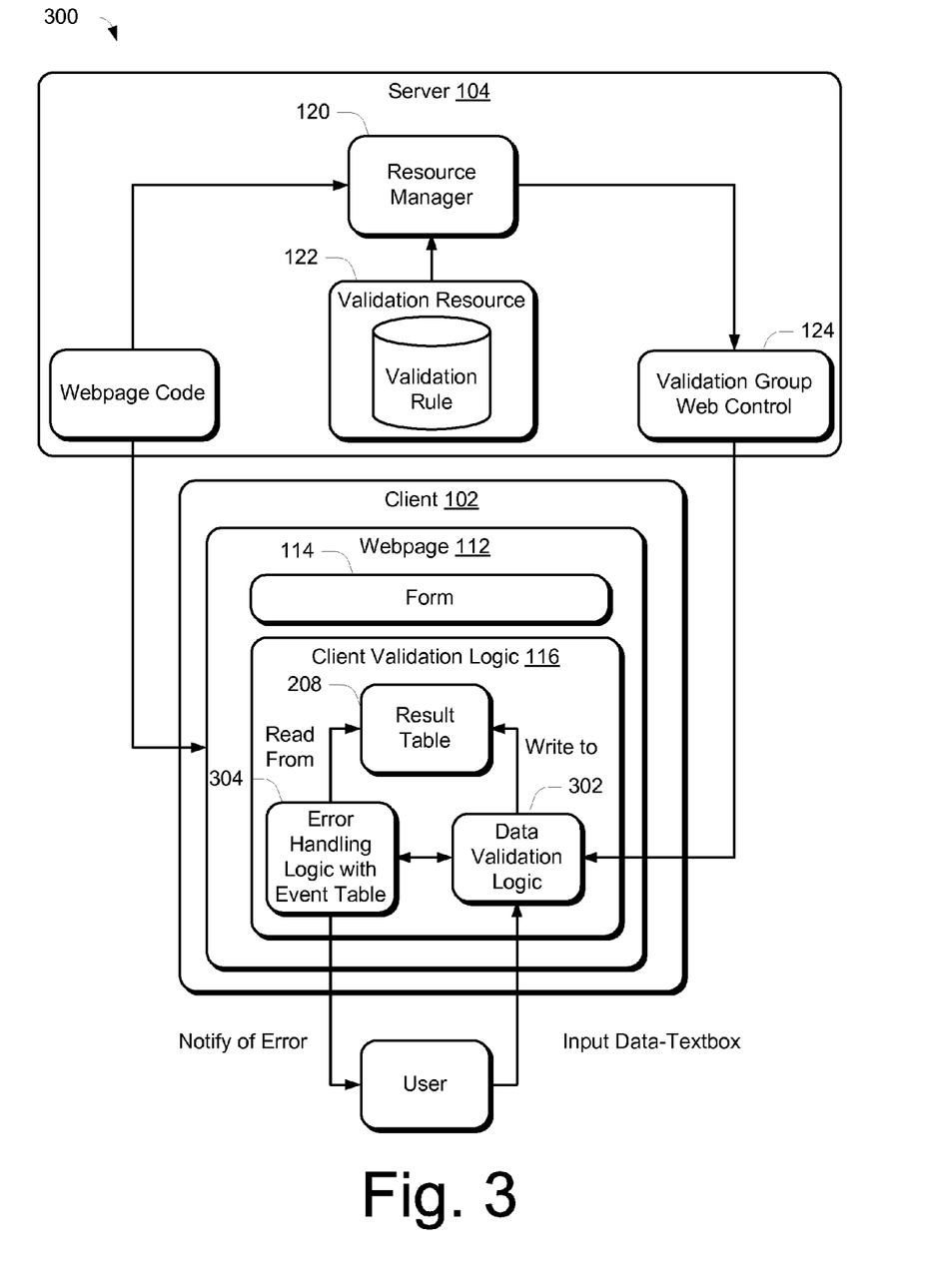
FIG. 3 illustrates a system in accordance with one or more embodiments.

FIG. 3 illustrates a system generally at 300, showing sample data flows in accordance with one or more embodiments. In this example, the client 102 includes client validation logic 116 including data validation logic 302, error handling logic 304 with an event table, and the result table 208. Although form validation and error handling are discussed together, in additional embodiments, form validation and error handling can be independent of each other. The data validation logic does nothing with page rendering, but just produces a result table in the client browser's memory. The error handling logic can read the result table and render error handling UI behaviors (e.g. show error message) to the user.

In the illustrated and described embodiment, the validation group web control 124 may indicate, to the resource manager 120, a locale for the client 102 accessing the webpage 112. The locale may be associated with one or more of a country, a region, a city, a state, a language, and so forth.

The resource manager 120 can read the validation rules for the webpage 112 from the validation resource 122 based on the locale. The validation rules can serve as a basis for generating client validation script that performs the client validation logic 116 that validates data input to the webpage 112, such as data input into a text box presented by the form 114.

The event table may specify validation rules for the text box. The following XML validation rules, from the validation resource 122, may be specified in the event table for a text box configured to accept a credit card number.

```
<Rule elementId="creditCardNumber">
    <Required>true</Required>
    <MinLength>13</MinLength>
    <MaxLength>16</MaxLength>
    <Pattern> [0-9]+$</Pattern>
</Rule>
```

The resource manager 120 can read the validation rules that are referenced by the validation group web control 124 from the validation resources 122, of course, according to the current user's market and country. Other validation rules associated with the webpage 112 can be read in a similar manner. As discussed above, "customized" validation rules may be stored in the validation resource 122 in a similar manner.

The validation group web control 124 can use the validation rules as a basis for generating data validation script that performs the data validation logic 302 for the text box. As a result, the validation group web control 124 may be isolated from HTML aspects of the webpage 112. The validation group web control 124 can obtain properties from the resource manager 120 to generate the data validation script that performs the data validation logic 302 for the text box independent or decoupled from the form 114 used to present the textbox. In a particular example, the validation group web control 124 can use the following sample code to parse the block of XML for the above credit card validation rules.

```
/// <summary>
/// ISaxValidator is a utility class to validate input parameters against
/// specific rules. Since different market, brand and productions
/// has different culture, we need to marketize the validation rules,
/// and that's why ISaxValidator implements IResource interface and
/// is regarded as a kind of resource.
/// </summary>
public interface ISaxValidator : IResource
{
    /// <summary>
    /// Validates the input parameters.
    /// </summary>
    /// <param name="inputParams">The input parameters.</param>
    /// <returns>Whether the input parameters are valid.</returns>
    bool Validate(NameValueCollection inputParams);
    /// <summary>
    /// Gets the max length validator.
    /// </summary>
    MaxLengthValidator MaxLengthValidator { get; }
    /// <summary>
    /// Gets the min length validator.
    /// </summary>
    MinLengthValidator MinLengthValidator { get; }
    /// <summary>
    /// Gets the required validator.
    /// </summary>
    RequiredValidator RequiredValidator { get; }
    /// <summary>
    /// Gets the pattern validator.
    /// </summary>
    PatternValidator PatternValidator { get; }
    /// <summary>
    /// Gets the enumeration validator.
    /// </summary>
    EnumValidator EnumValidator { get; }
}
```

Thus, the generated validation script can map to an XML schema of the validation rules. In this particular example, the validation group web control 124 can parse the validation rules and extract each element. As a result, when a simple validator tag is encountered, the validation group web control 124 can read the value of an element ID for each element and the body event for each parameter. In this way, the validation group web control 124 can attach a new handler to trigger validation of the data in the text box. In this particular example, the validation group web control 124 can generate the corresponding client validation script to perform the client validation logic 116 when the value of the element ID is located. For example, the validation group web control 124 can generate the client validation script so that a validation event is triggered when blur and focus events are indicated by the body events in the sample code above.

The validation group web control 124 may bind the validation event to the particular visual element on the webpage 112, e.g., the text box. The data validation script that performs the data validation logic 302 can be embedded in the form 114 to validate whether the entered data meets the validation rules specified in the event table for the visual element. As a result, the data validation logic 302 can check data entered into the text box to determine whether the data is valid, upon the occurrence of the blur and focus events as described below. Thus, for the credit card number text box the validation can determine whether the max length, min length, and pattern are valid.

The following particular example may be used to implement the ISaxValidator instance, above, when generating the client validation script that is used to perform the client validation logic 116. The following particular example implements ten basic script functions. The first set of five script functions are associated with validating before the data is submitted (e.g., before a submit button has been selected), while the second set of five functions are associated with validation once the submit button has been selected. Thus, the validation group web control 124 can load the validator properties (four are referenced) and try to read the simple validator tags for the properties.

```
<sax:ValidationGroup ID="ValidationGroup" FormID="aspnetForm"
runat="server">
    <SimpleValidation
        PrePreProcessFunction="addPI$PrePreProcess"
        PreProcessFunction="addPI$PreProcess"
        ProcessFunction="addPI$Process"
        PostProcessFunction="addPI$PostProcess"
        PostPostProcessFunction="addPI$PostPostProcess"
        PrePreProcessSubmitFunction="addPI$PrePreProcessSubmit"
        PreProcessSubmitFunction="addPI$PreProcessSubmit"
        ProcessSubmitFunction="addPI$ProcessSubmit"
        PostProcessSubmitFunction="addPI$PostProcessSubmit"
        PostPostProcessSubmitFunction="addPI$PostPostProcessSubmit"
    >
        <sax:SimpleValidator
            ID="SimpleValidator1" runat="server"
ElementId="creditCardNumber"
            BindingEvents="blur,focus"
            OnPassArgs="'creditCardNumberLabel'"
            OnErrorArgs="'creditCardNumberLabel'"
        >
            <RequiredValidationAction OnErrorArgs="'Credit card number
is required.'" OnPassArgs="''" />
            <MinLengthValidationAction OnErrorArgs="'Credit card
number is too short.'" OnPassArgs="''" />
            <MaxLengthValidationAction OnErrorArgs="'Credit card
number is too long.'" OnPassArgs="''" />
            <PatternValidationAction OnErrorArgs="'Credit card number is
bad-formatted.'" OnPassArgs="''" />
        </sax:SimpleValidator>
    </SimpleValidation>
</sax:ValidationGroup>
```

In this manner, when an event is triggered as described in the binding events parameter (e.g., blur, focus), an instance of the ISaxValidator can be invoked to validate the entered data on the client. Although blur and focus binding events are mentioned, key press and/or other events may trigger validation. Thus, if the number is too short the message "credit card number is too short" can be presented. Although predefined process functions are discussed, custom process functions can be handled in a similar manner.

The group web control 124 can then script the results. In this particular example, the validation may be performed both on the client 102 using the embedded Javascript in the form 114 and re-checked on the server. By re-checking the validation at the server 104, unauthorized access can be avoided.

Figure 4:
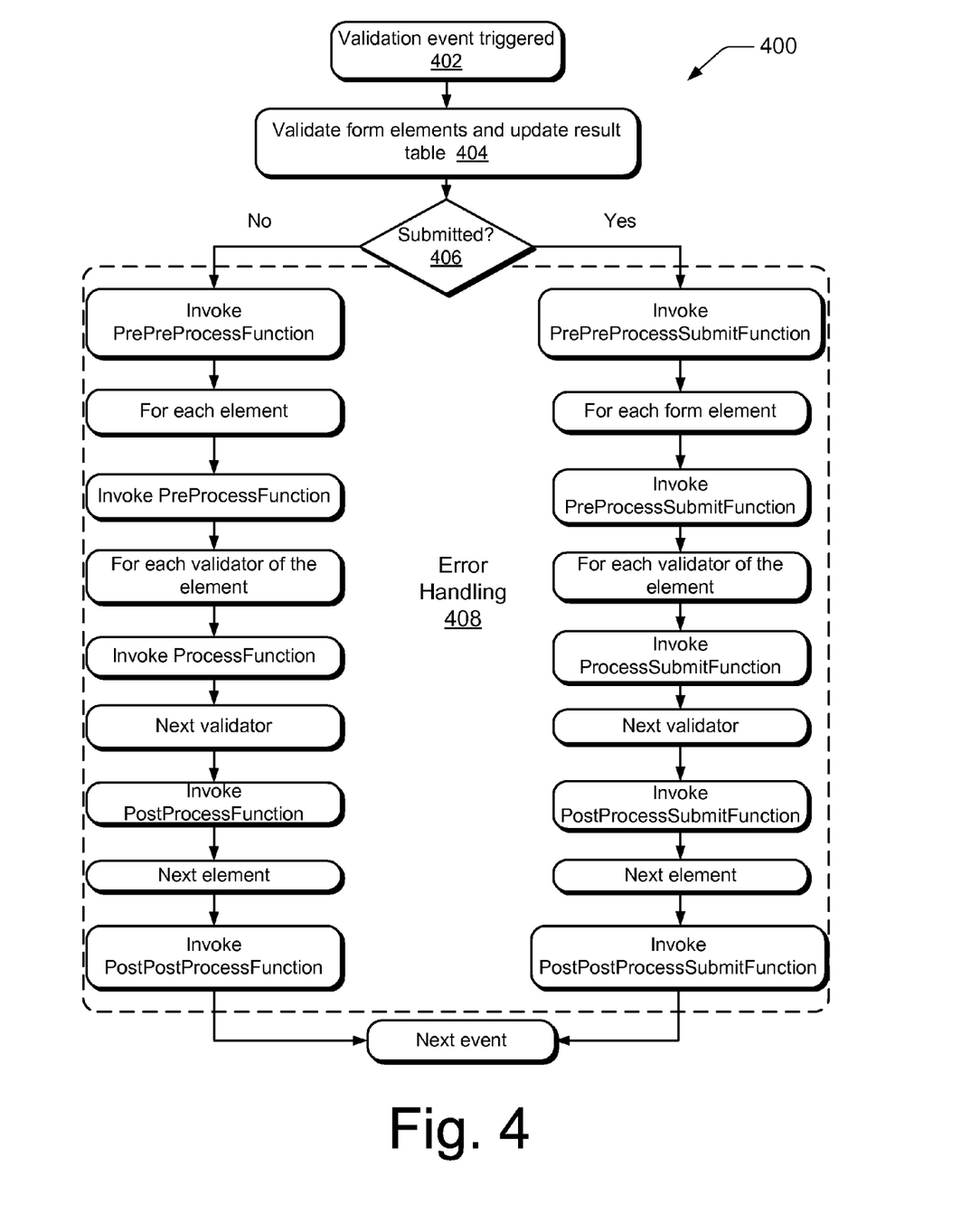
FIG. 4 is a flow diagram that describes steps in a method in accordance with one or more embodiments.

FIG. 4 illustrates a particular example of logic 400 performed by the client validation script for the ISaxValidator instance of FIG. 3. Step 402 is an event that triggers validation. For example, entering a digit in a text box for an email address. Other events include, but are not limited to, blur and focus.

Step 404 validates the form element and updates the result table with the result of the validation, e.g., success, failure. Step 406 makes a determination of whether data is submitted or not. The determination can indicate whether text is being currently entered or whether a submit button associated with the text box has been selected. Step 408 performs error handling according to the "no" and "yes" branches from the submit decision of step 406 and can be used to provide information regarding an error, e.g., an error has occurred—the data entered in the text box is too short to be an email address.

The "no" branch can be followed when the submit button associated with the text box has not been selected. For example, the PrePreProcessFunction, PreProcessFunction, ProcessFunction, PostProcessFunction, and the PostPostProcessFunction can be used to validate characters entered into a text box used to accept a user email address. The preceeding example corresponds to the first five script functions described in FIG. 3. The "yes" branch is followed when the submit button has been selected. The PrePreProcessSubmitFunction, PreProcessSubmitFunction, ProcessSubmitFunction, PostProcessSubmitFunction, and the PostPostProcessSubmitFunction can be used once an associated submit button is selected. These process submit functions correspond to the second five script functions described in FIG. 3.

Having considered a validation implementation and error handling example, an example event table is now described. The event table may be used for form validation and/or error handling as described above and below in FIG. 6. In one or more embodiments, the event table is embedded in the webpage 112 in a separate file. The event table is referenced below as "event driven action table" written in Javascript.

```
// Event driven action table
var addPI$ProcessTable =
{
// event | current valid | ever focused | last valid
    'blur' :{ 0: { 0: { 0: 'S',
            1: 'S' },
        1: { 0: 'S',
            1: 'S' }},
    1: { 0: { 0: '-',
            1: 'F' },
        1: { 0: '?',
            1: 'F' }}},
    'focus':{ 0: { 0: { 0: '-',
            1: 'F' },
        1: { 0: 'S',
            1: 'S' }},
    1: { 0: { 0: '-',
            1: 'F' },
        1: { 0: '?',
            1: 'F' }}}
};
```

Thus, for the first line ('blur': {0:{0:{0:), an error message is presented when the event blur is triggered and the following conditions are met: the current element is valid currently, there has not been a focus event, and the last element is not valid. In other words, the first column in "{0:{0:{0:" describes whether the element is currently valid (the current status), the second column represents whether the text box has been focused (whether the last validation passed or not), and the last column is associated with whether an error message is to be presented.

In the above event table "S" represents present an error message; "-" represents take no action; "F" represents show the first error if invalid data is found and presented and show "required fields;" and "?" represents do as "F" does if the last focused text box is the current text box. In an example, the first line of the table indicates that an error message is to be presented for the current text box under the following conditions: text box is no longer focused, invalid data is included, no focus has occurred, or the last validation failed. This may be performed several times. The preceding example may occur when a user has entered part of a credit card number correctly but then goes back and changes some of the digits so that the credit card number is no longer valid. In this case, the webpage 112 may present the error message informing the user of the error.

In one or more embodiments, the preexisting functions can be replaced by custom functions provided by the developer. For example, the event table may include a function that is specific to the webpage 112.

Figure 5:
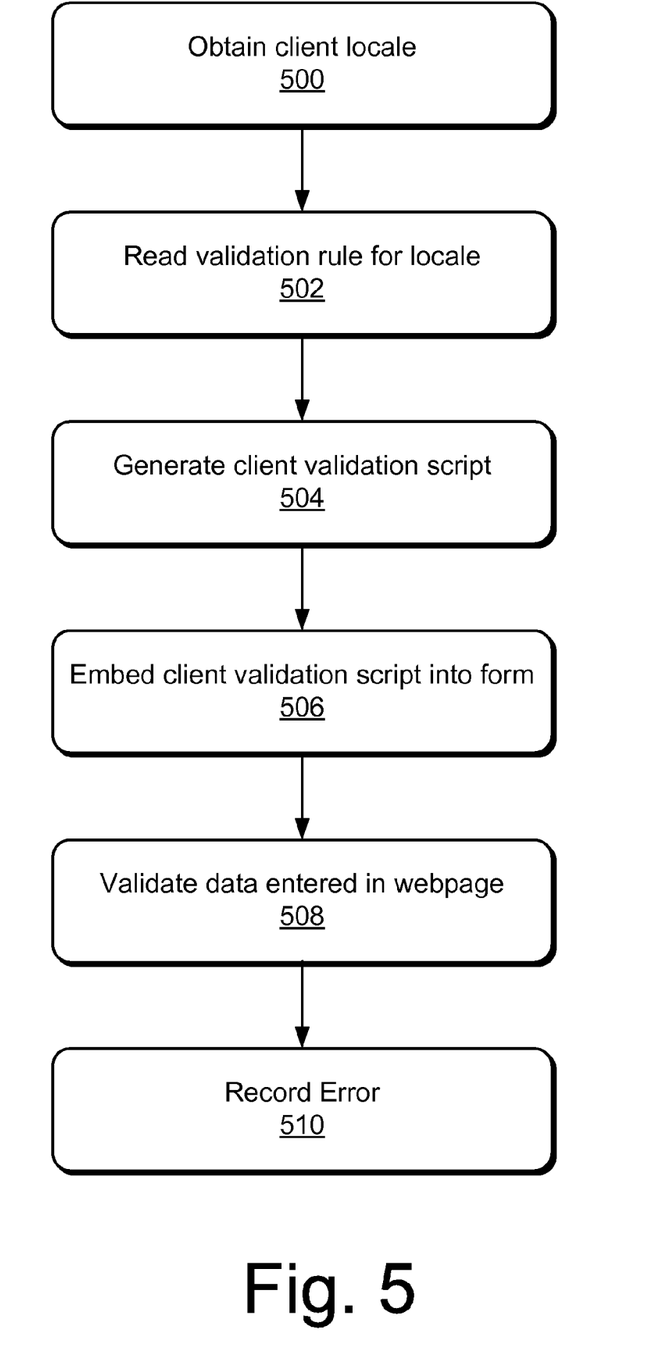
FIG. 5 is a flow diagram that describes steps in a method in accordance with one or more embodiments.

FIG. 5 is a flow diagram that describes steps in a process for validating data for a web application in accordance with one or more embodiments. The method can be implemented in connection with any suitable hardware, software, firmware or combination thereof. In at least some embodiments, the method can be implemented in software such as that described above.

Step 500 obtains a client locale. An example of how this can be done is provided above. Step 502 reads one or more validation rules for the locale. Step 504 generates client validation script for performing client validation logic. For example, the client validation script may be generated by parsing the validation rules to obtain the parameters that are used to formulate the client validation script.

Step 506 embeds the client validation script into a form that is to be presented as part of a webpage. Step 508 uses the client validation script to perform the client validation logic to validate data entered in the webpage. Step 510 records an error record in a result table when the data is not valid.

Figure 6:
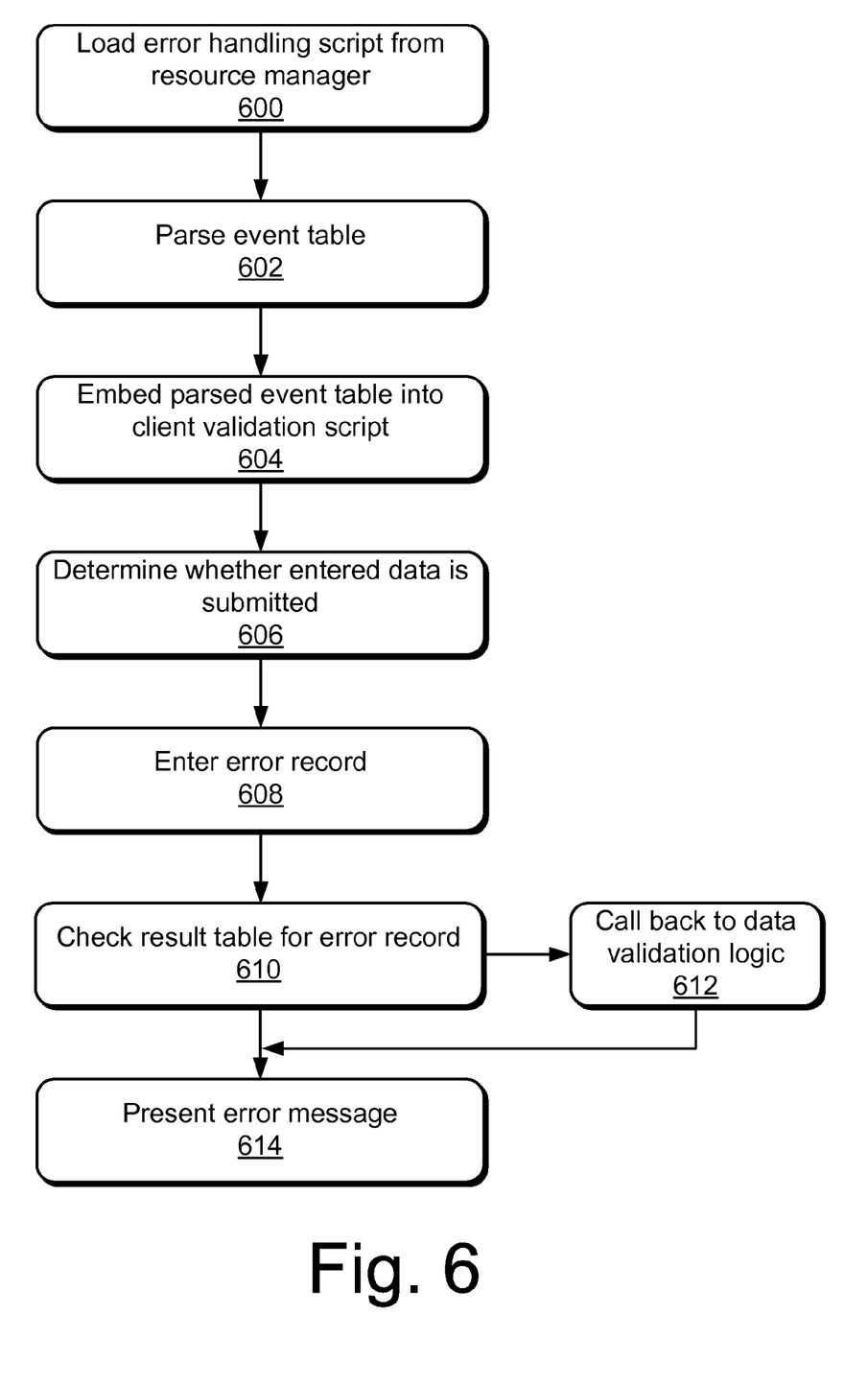
FIG. 6 is a flow diagram that describes steps in a method in accordance with one or more embodiments.

FIG. 6 is a flow diagram that describes steps in an error handling method for presenting an error message in accordance with one or more embodiments. The method can be implemented in connection with any suitable hardware, software, firmware or combination thereof. In at least some embodiments, the method can be implemented in software such as that described above. The error handling process can be used in conjunction with the data validation process of FIG. 5.

Step 600 loads error handling script from a resource manager. In a particular example, error handling script is downloaded from the resource manager. The error handling script can be used to perform the error handling logic. The error handling script can present a message that indicates whether data entered in a text box is correct.

Step 602 parses an event table using the error handling script. For example, the event table may define what events can trigger validation and what errors for the events are associated with an error message as described above. In the example described above, blur and focus events trigger validation.

Step 604 embeds the parsed event table into the client validation script. Step 606 determines whether entered data is submitted. The data can be submitted when a user selects a submit button associated with the text box that accepts entered data. The determination can indicate which error messages are relevant to a current situation. The error messages can include error messages that are presented as a user is typing and error messages that are presented once the data is submitted to the webpage.

Step 608 enters error records in a result table. The records can be entered as a result of the validation method of FIG. 5. For example, when an event is not validated an error record can be entered in the result table to indicate an error has occurred.

Step 610 checks the result table for an error record that corresponds to an error message. In one or more embodiments, step 612 calls back to the data validation logic. A call back can be used to inform the data validation logic of the success, failure, and the like.

When the error record corresponds to an error message, the error message can be presented at step 614. For example, a text warning may be presented with the webpage to let the user know that an entered credit card number is too short.

Example System

Figure 7:
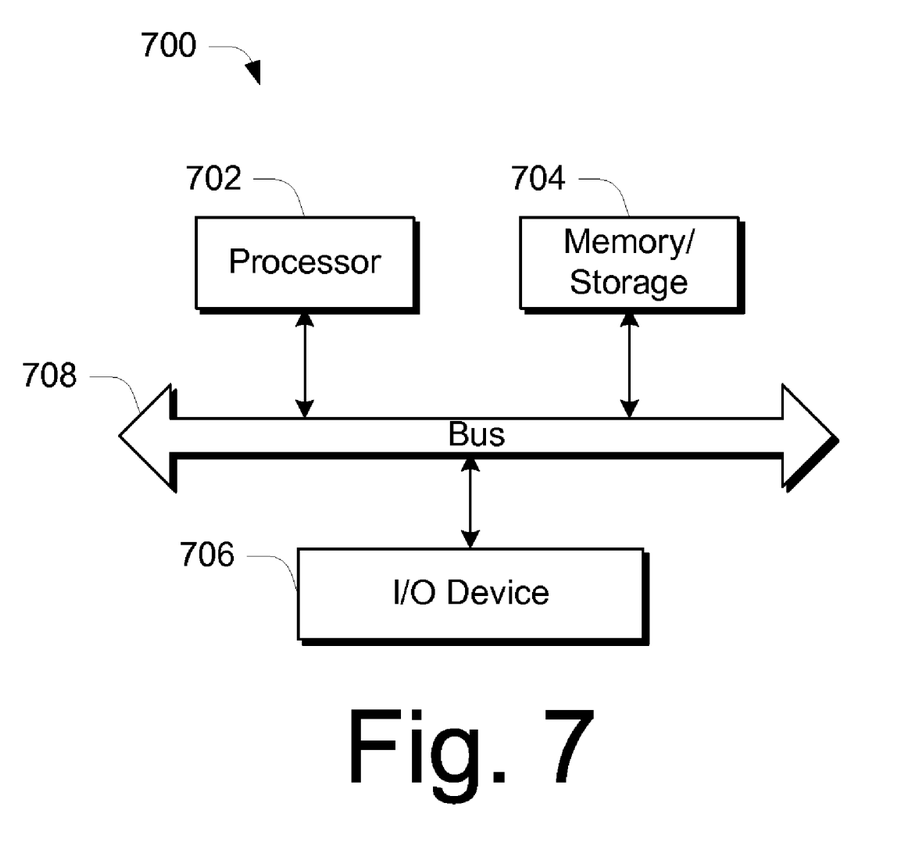
FIG. 7 is a block diagram of an example computing system in accordance with one or more embodiments.

FIG. 7 illustrates an example computing device 700 that can implement the various embodiments described above. Computing device 700 can be, for example, the server 104 and/or client 102 of FIG. 1 or any other suitable computing device.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or non-volatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide a validation framework to validate whether data entered in a web application is valid. The framework includes a validation resource that contains a validation rule for the web application. The framework also includes a validation group web control that can generate client validation script that is useable by a client to validate whether the entered data is valid. In at least some embodiments, an event table that specifies the validation rules is used to present an error message when the entered data is not valid.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A method comprising:
   determining a locale that includes a client that accessed a webpage using an Internet Protocol address associated with the client;
   reading a validation rule for the locale that includes the client that accessed the webpage;
   generating validation script to check whether data entered into the webpage is valid for the locale, the validation script being configured to be embedded in a form used to present the webpage; and
   generating an error handling script configured to:
      check a result table for an error record associated, at least in part, with the validation script;
      determine the error record corresponds to an error in an event table, the event table comprising multiple entries, each entry configured to associate an event to multiple error conditions and an error message, at least one error condition associated with a current validation state associated with the form and at least one error condition associated with a last validation state associated with the form; and
      responsive to determining the error record corresponds to an error in the event table, present, based at least in part on the multiple error conditions, an associated error message.

2. The method according to claim 1, wherein the event table includes a customized validation rule for inclusion in the validation script.

3. The method according to claim 1, wherein the validation script is further configured to validate text entered in a text box on the webpage.

4. The method according to claim 3, wherein the text box comprises a hypertext markup language (HTML) text box.

5. The method according to claim 1, wherein the validation script is generated independent of the form that presents visual aspects of the webpage.

6. The method according to claim 1, wherein generating validation script further comprises loading the validation rules to initiate validation properties.

7. The method according to claim 1, wherein reading further comprises inputting the validation rule into an extensible markup language (XML) schema.

8. One or more computer-readable hardware storage media embodying computer-readable instructions which, when executed, provide a framework that comprises:
   a validation resource that contains a validation rule for a text box on a webpage, the validation rule residing in an event table additionally specifying error handling logic for the validation rule, the event table comprising multiple entries, each entry comprising information describing:
      an event;
      a first error condition associated with a current validation state associated with the text box;
      a second error condition associated with a last validation state associated with the text box; and
      an error message to display based, at least in part, on the first and second error conditions; and
   a validation group web control to generate data validation script from the validation rule, in which the data validation script is useable by a client to validate whether data entered in the text box is valid.

9. The one or more computer-readable hardware storage media of claim 8, wherein the instructions are further executable to output an interface that accepts the validation rule.

10. The one or more computer-readable hardware storage media of claim 8, wherein the validation group web control is further configured to embed the data validation script such that a validation event associated with the validation script is bound to the text box.

11. The one or more computer-readable hardware storage media of claim 8, wherein the text box comprises a hypertext markup language (HTML) text box.

12. The one or more computer-readable hardware storage media of claim 8, wherein the validation group web control is further configured to obtain a locale associated with a client accessing the webpage.

13. One or more computer-readable hardware storage media embodying computer-readable instructions which, when executed, are configured to:
   determine one or more validation rules based, at least in part, on an Internet Protocol address associated with a client that accessed a webpage;
   insert the one or more validation rules into an event table that specifies one or more validation rules for a text box on the webpage, the event table comprising multiple entries, each entry configured to enable inclusion of information describing:
      an event;
      a first error condition associated with a current validation state associated with the text box;
      a second error condition associated with a last validation state associated with the text box; and
      an error message to display based, at least in part, on the first and second error conditions;
   parse the event table that specifies the one or more validation rules for the text box on the webpage; and
   embed the parsed event table into a client validation script such that the client validation script logs an error record in a result table responsive to a determination that data entered in the text box is not valid for the validation rule, the result table configured to record error and success events associated with the one or more validation rules.

14. The one or more computer-readable hardware storage media of claim 13, wherein the instructions are further configured to determine whether the data entered in the text box has been submitted.

15. The one or more computer-readable hardware storage media of claim 13, wherein the instructions are further configured to:
   check the result table for the error record; and
   present an error message, associated with the record, designated by the event table.

16. The one or more computer-readable hardware storage media of claim 13, wherein the event table includes a customized validation rule.

17. The one or more computer-readable hardware storage media of claim 13, wherein the instructions are further configured to read the validation rule from a validation resource.

18. The one or more computer-readable hardware storage media of claim 13, wherein the instructions are further configured to call back to data validation logic provided by the client validation script, responsive to a check that indicates the record is in the result table.

19. The one or more computer-readable hardware storage media of claim 13, wherein the text box comprises a hypertext markup language (HTML) text box.

* * * * *